(12) United States Patent
Pacheco

(10) Patent No.: US 11,001,383 B2
(45) Date of Patent: May 11, 2021

(54) SUSPENSION RECLINE SYSTEM

(71) Applicant: AMI Industries, Inc., Colorado Springs, CO (US)

(72) Inventor: Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 641 days.

(21) Appl. No.: 15/368,234

(22) Filed: Dec. 2, 2016

(65) Prior Publication Data

US 2018/0155033 A1  Jun. 7, 2018

(51) Int. Cl.
*B64D 11/06* (2006.01)
*B60N 2/90* (2018.01)
*B60N 2/50* (2006.01)

(52) U.S. Cl.
CPC ............ *B64D 11/064* (2014.12); *B60N 2/504* (2013.01); *B60N 2/995* (2018.02); *B64D 11/0641* (2014.12); *B64D 11/0643* (2014.12); *B64D 11/0691* (2014.12)

(58) Field of Classification Search
CPC ............ B64D 11/064; B64D 11/0641; B64D 11/0643; B64D 11/0691
USPC .................................. 297/14, 280, 281, 282
See application file for complete search history.

(56) References Cited

U.S. PATENT DOCUMENTS

| 636,725 | A | 11/1899 | Healy |
| 668,268 | A | 2/1901 | Streit |
| 2,583,372 | A | 1/1952 | Hall |
| 5,449,221 | A | 9/1995 | Stander |
| 6,517,160 | B2 | 2/2003 | Marcantoni |
| 6,652,033 | B2 | 11/2003 | Satoh |
| 6,669,143 | B1 | 12/2003 | Johnson |
| 6,764,132 | B1 * | 7/2004 | Gaertner .................. A47C 4/44 297/130 |
| 7,121,627 | B2 | 10/2006 | Gaikwad et al. |
| 7,201,451 | B2 | 4/2007 | Baumann |
| 8,434,825 | B2 | 5/2013 | Wesselink |
| 8,444,225 | B2 | 5/2013 | Behe |
| 8,602,499 | B2 | 12/2013 | Driessen et al. |
| 8,882,034 | B2 | 11/2014 | McKeever |

(Continued)

FOREIGN PATENT DOCUMENTS

| EP | 1099627 | 5/2001 |
| EP | 3072815 | 9/2016 |

OTHER PUBLICATIONS

European Patent Office, European Search Report dated Apr. 18, 2018 in Application No. 17205027.0-1010.

(Continued)

*Primary Examiner* — Anthony D Barfield
(74) *Attorney, Agent, or Firm* — Snell & Wilmer L.L.P.

(57) ABSTRACT

A suspension recline system for a stowable seat may comprise a suspension member comprising a first end configured to be coupled to a seat back of the stowable seat, and a second end configured to be coupled to a legrest for the stowable seat, wherein the suspension recline system is moveable between a stowed position and a deployed position. The stowable seat may recline in response to the suspension recline system being moved to the deployed position. An end of the suspension member may be configured to be inserted into a slot disposed in the legrest, in the deployed position.

7 Claims, 13 Drawing Sheets

(56) References Cited

U.S. PATENT DOCUMENTS

| | | |
|---|---|---|
| 9,185,983 B1 * | 11/2015 | Cohen .................. A47C 4/52 |
| 9,352,674 B2 | 5/2016 | Suhre et al. |
| 9,446,849 B1 | 9/2016 | Pinkal |
| 2014/0166808 A1 | 6/2014 | Boenning et al. |
| 2015/0336487 A1 | 11/2015 | Blackledge |

OTHER PUBLICATIONS

Pacheco et al., U.S. Appl. No. 15/335,140, filed Oct. 26, 2016 entitled "Cabin Attendant Seat Legrest With an Extendable Footrest".

European Patent Office, European Office Action dated Nov. 10, 2020 in Application No. 17205027.0.

* cited by examiner

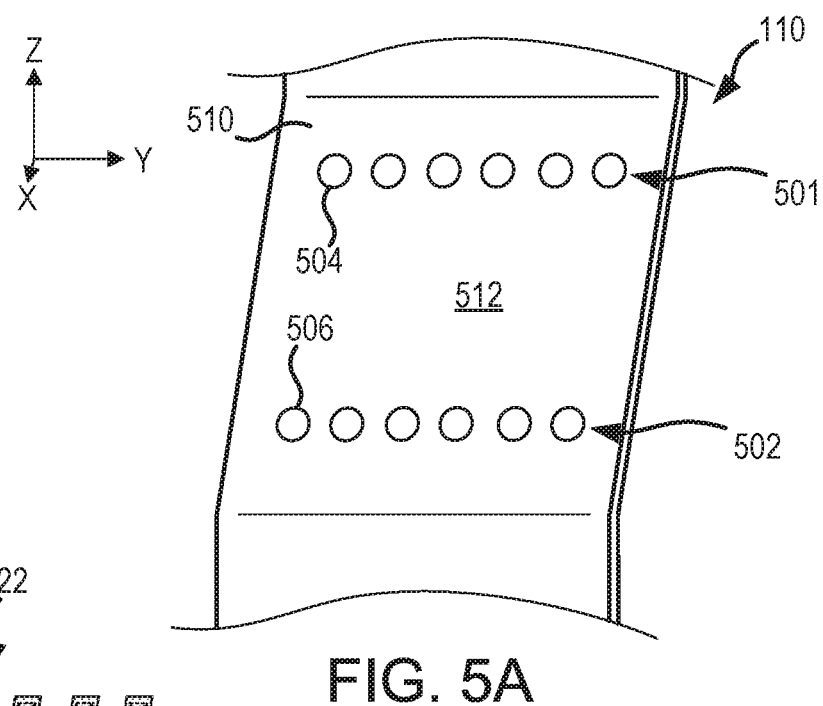
FIG. 5A
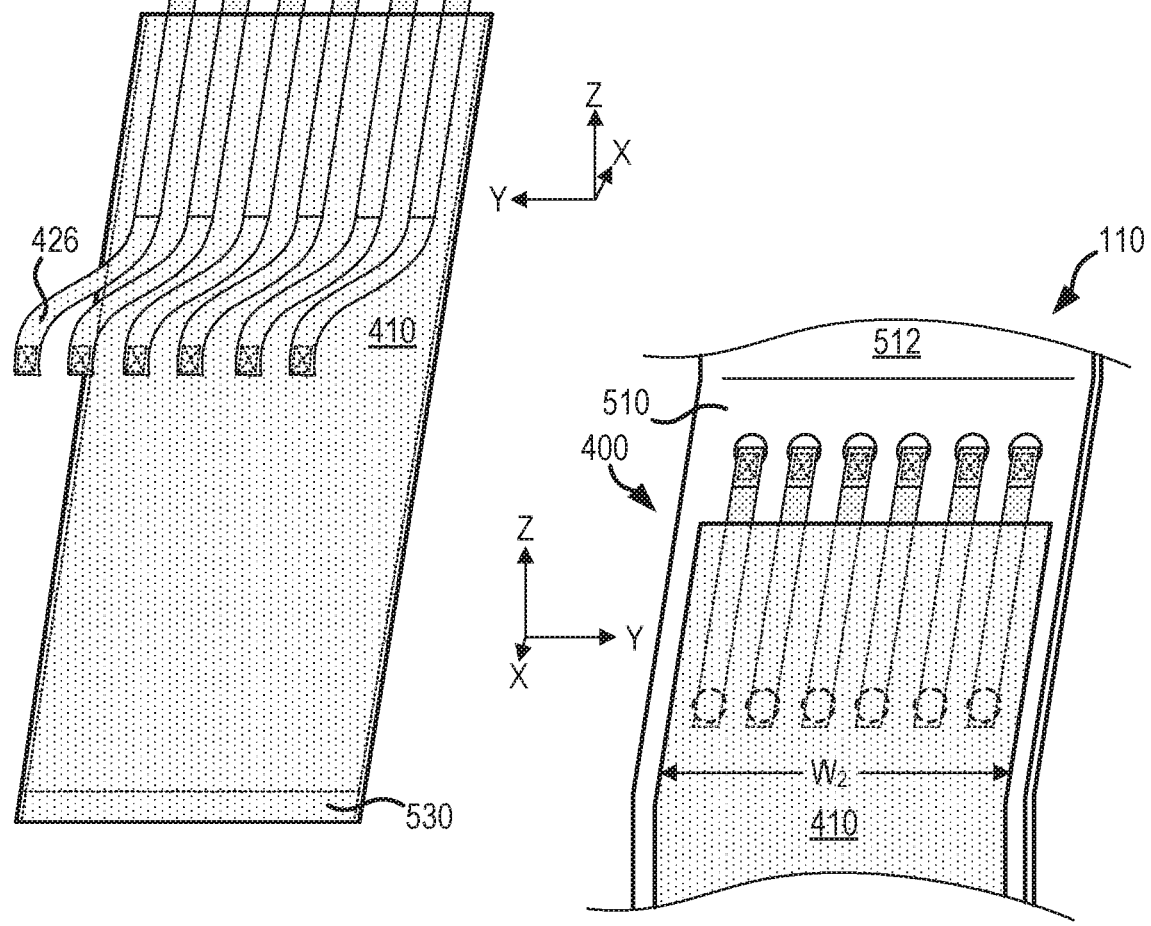
FIG. 5B
FIG. 5C

SUSPENSION RECLINE SYSTEM

FIELD

The present disclosure relates to stowable aircraft seats, and, more specifically, to a recline system for a stowable aircraft seat.

BACKGROUND

Aircraft cabin seats are used for flight attendant safety and comfort during taxi, takeoff, landing, and inflight rest periods. Useable volumetric space on an aircraft may be too limited for large, bulky seats. Additionally, seats should not hinder ingress and egress for passengers in the event of an emergency. Aircraft cabin seats may be used for long periods of time and longer duration flights. An uncomfortable cabin seat may cause pain and/or discomfort for the crew on an aircraft.

SUMMARY

A suspension recline system for a stowable seat is disclosed herein, in accordance with various embodiments. A suspension recline system for a stowable seat may comprise a a suspension member comprising a first end configured to be coupled to a seat back of the stowable seat, and a second end configured to be coupled to a legrest for the stowable seat, wherein the suspension recline system is moveable between a stowed position and a deployed position.

In various embodiments, the stowable seat may be configured to recline in response to the suspension recline system being moved to the deployed position. The suspension member may comprise a fabric. The suspension member may be configured to be coupled to a seat back cushion and a seat bottom cushion, the seat bottom cushion configured to move away from the seat back in response to the suspension member moving to the deployed position, and the seat back cushion configured to recline in response to the suspension member moving to the deployed position. The suspension recline system may further comprise a rigid insert coupled to the second end, wherein the legrest comprises a slot configured to receive at least a portion of the rigid insert. The rigid insert may comprise a sheet of metal. The suspension member may be configured to bend at the rigid insert. The rigid insert may be configured to support the seat bottom cushion in a tilted position, in the deployed position. The suspension member may be configured to be suspended between the seat back and the legrest, in the deployed position.

A stowable seat is disclosed herein, in accordance with various embodiments. A stowable seat may comprise a seat back, a seat bottom, a legrest, and a suspension recline system comprising a suspension member comprising, a first end coupled to the seat back, and a second end configured to be coupled to the legrest, wherein the suspension recline system is moveable between a stowed position and a deployed position.

In various embodiments, the stowable seat may recline in response to the suspension recline system being moved to the deployed position. The suspension member may comprise a fabric. The suspension member may be configured to be coupled to a seat back cushion and a seat bottom cushion, the seat bottom cushion configured to move away from the seat back in response to the suspension member moving to the deployed position, and the seat back cushion configured to recline in response to the suspension member moving to the deployed position. The suspension recline system may further comprise a rigid insert coupled to the second end, wherein the legrest comprises a slot configured to receive at least a portion of the rigid insert. The rigid insert may comprise a sheet of metal. The rigid insert may be configured to support the seat bottom cushion in a tilted position in response to the suspension member being in the deployed position. The suspension member may be configured to be suspended between the seat back and the legrest in the deployed position. A width of the suspension member may be substantially equal to a width of at least one of the seat bottom cushion or the seat back cushion.

A method for reclining a seat is disclosed herein, in accordance with various embodiments. A method for reclining a seat may comprise moving a second end of a suspension member towards a legrest, reclining a seat back of the seat in response to the moving, and coupling at least a portion of the second end to the legrest, wherein a first end of the suspension member is configured to be coupled to the seat back and the second end of the suspension member is configured to be coupled to the legrest.

In various embodiments, the method may further comprise tilting a seat bottom in response to the coupling.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 5A illustrates a perspective view of a seat back with the cushion removed, the seat back having a plurality of apertures, in accordance with various embodiments;

FIG. 5B illustrates a perspective view of the back side of a suspension member, in accordance with various embodiments;

FIG. 5C illustrates a perspective view of the suspension member coupled to the seat back, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 4A:
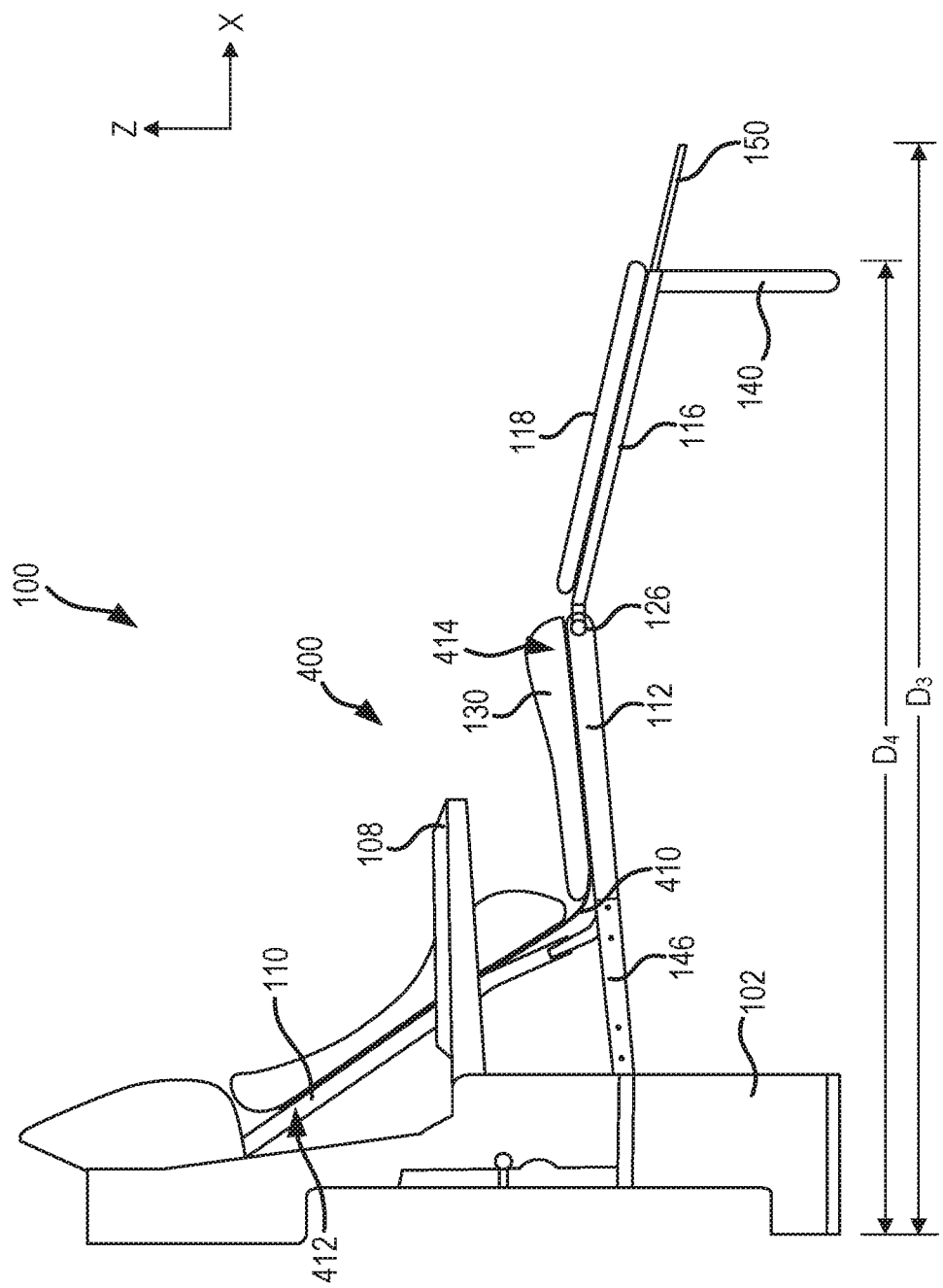
FIG. 4A illustrates a side view of a stowable seat in a deployed position with a suspension recline system in a stowed position, in accordance with various embodiments.
Figure 4B:
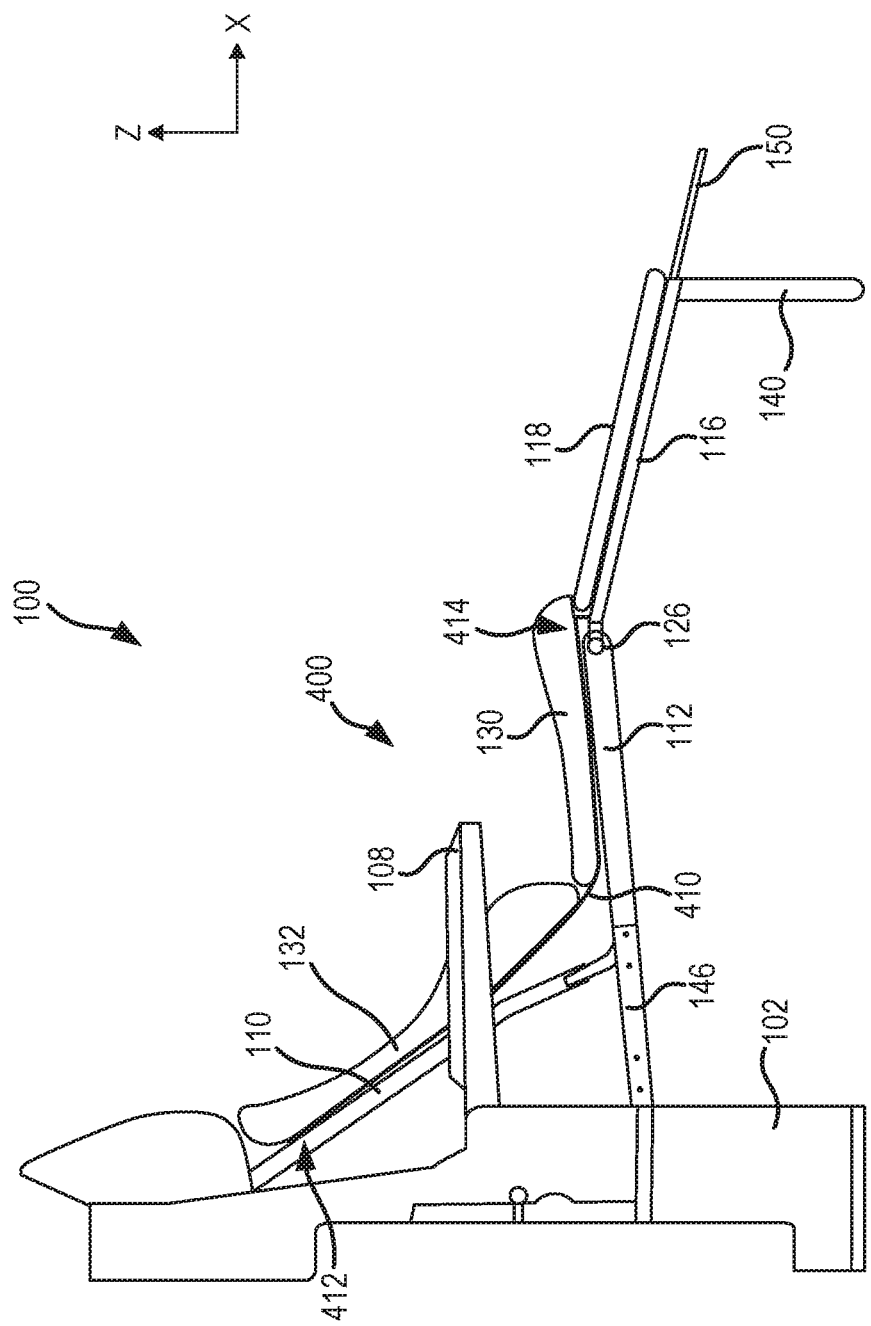
FIG. 4B illustrates a side view of a stowable seat in a deployed position with a suspension recline system in a deployed position, in accordance with various embodiments.

With respect to FIG. 5A through FIG. 8C, elements with like element numbering, as depicted in FIG. 4B, are intended to be the same and will not necessarily be repeated for the sake of clarity. With respect to FIG. 6B through FIG. 8C, elements with like element numbering, as depicted in FIG. 6A, are intended to be the same and will not necessarily be repeated for the sake of clarity.

Regulatory requirements for aircraft vary by region. For example, Class II facility requirements stated in EU regulation ORO.FTL.205 (e)/CS.FTL.1.205(C), mandate a "Class 2 rest facility" (i.e., a seat in an aircraft cabin or flight crew compartment) to provide "a seat in an aircraft cabin that reclines at least 45° back angle to vertical." A stowable seat, as disclosed herein, may satisfy these requirements, among others, in accordance with various embodiments.

Figure 1:
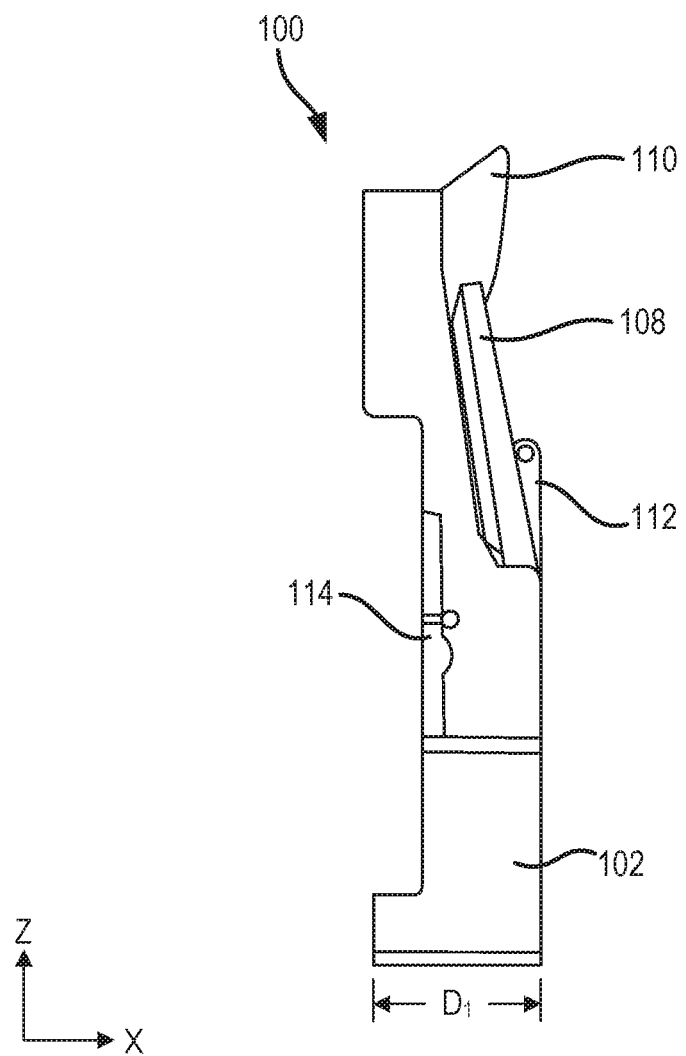
FIG. 1 illustrates a side view of a stowable seat in a stowed position, in accordance with various embodiments.
Figure 2:
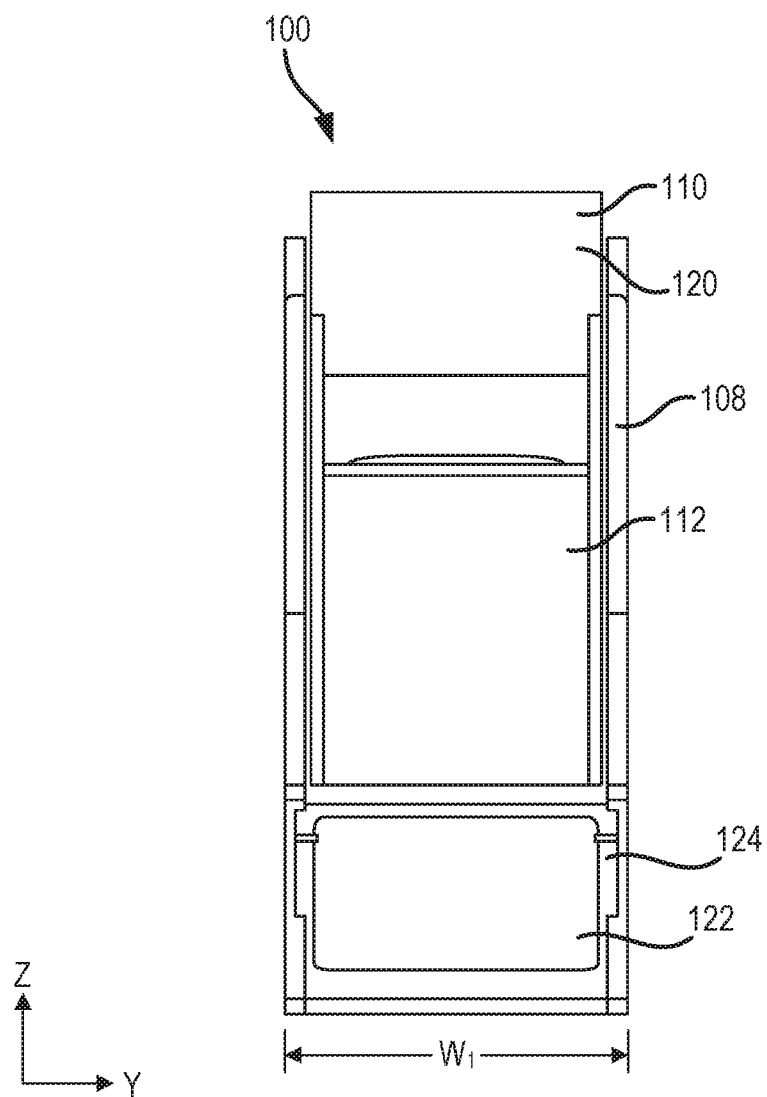
FIG. 2 illustrates a front view of a stowable seat in a stowed position, in accordance with various embodiments.

With reference to FIGS. 1 and 2, a stowable seat 100 is shown in a stowed position with seat back 110 and seat bottom 112 partially stored within housing 102. Xyz-axes are provided for ease of illustration. Housing 102 provides structural support and defines the depth D1 of the envelope of stowable seat 100 in a stowed position. Depth D1 may be less than 1 foot (30.5 cm). For example, the depth D1 of stowable seat 100 in a stowed position may be 11.5 inches (29.21 cm) at the base of housing 102. Feet may protrude downward (negative z-direction) from housing 102 of stowable seat 100 and provide a mounting point to mount stowable seat 100 to an aircraft floor, for example.

In various embodiments, arm rests 108 may be pivotally coupled to housing 102 such that arm rests 108 may pivot towards housing 102 into a stowed position. Seat back 110 may protrude vertically from housing 102 when stowable seat 100 is configured in a stowed position. Seat bottom 112 may pivot upward (i.e., in the positive z-direction) and towards seat back 110 so that seat bottom 112 is disposed at least partially in housing 102. Tray table 114 may store in a recess in housing 102. Tray table 114 may be removed from housing 102 and removably coupled to arm rests 108 to provide a working surface for an occupant of stowable seat 100.

In various embodiments, seat back 110 may include a cushion 120 facing outward from housing 102. A door 122 may open into a stow compartment 124. Width $W_1$ may define a width of the envelope of stowable seat 100 configured in a stowed position. Width $W_1$ may be approximately 20 inches (50.8 cm), for example. Stowable seat 100 in the stowed position may occupy less space than stowable seat 100 in a deployed position. In that regard, stowable seat 100 may be stowed to conserve useable volume in an aircraft or other application where space is limited.

Figure 3A:
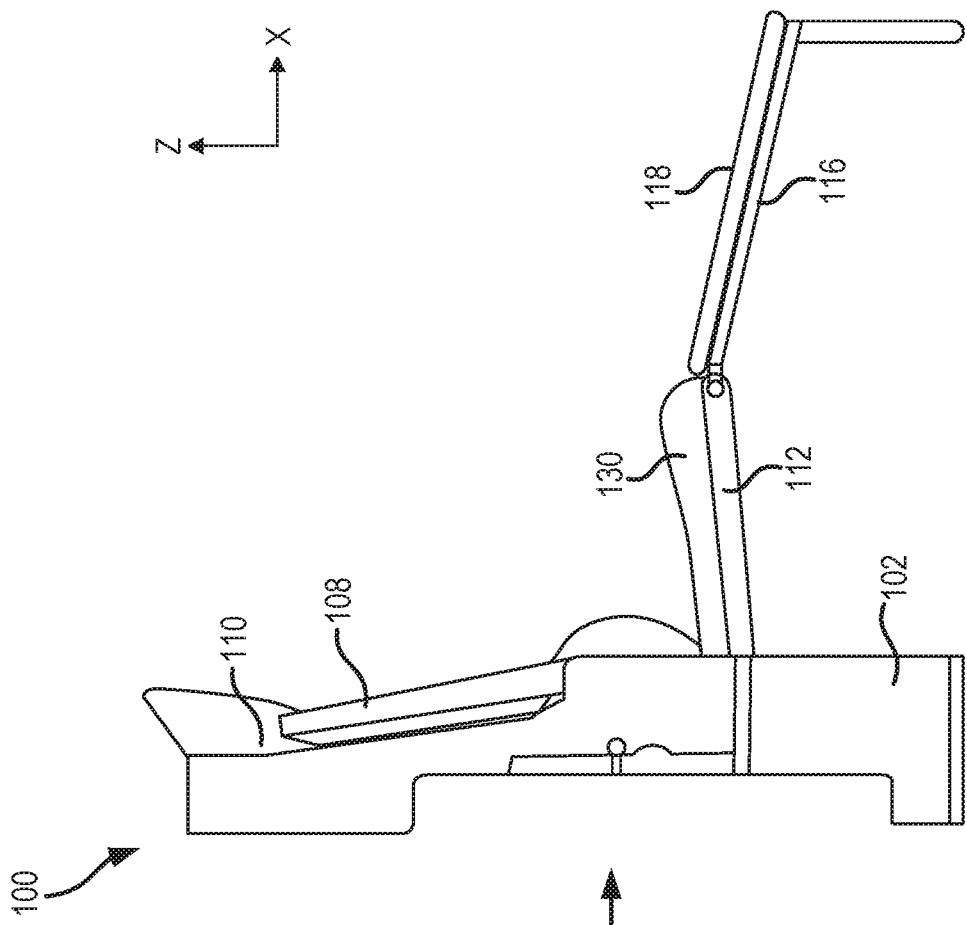
FIG. 3A illustrates a side vide of a stowable seat in a partially deployed position without a legrest attached to the seat bottom, in accordance with various embodiments.

With reference to FIG. 3A, a side vide of a stowable seat 100 is shown in a partially deployed position, in accordance with various embodiments. Seat bottom 112 may be pivotally coupled to housing 102 such that seat bottom 112 may fold away from housing 102. Seat bottom cushion 130 of seat bottom 112 may be oriented to face upward (i.e., in the positive z-direction) in the partially deployed position. In the partially deployed position, seat bottom 112 may slide laterally outward from housing 102 along a track. Seat back 110 and arm rest 108 may also remain in the stowed position, however seat back 110 may also translate laterally as seat bottom 112 slides along a track until seat back 110 is oriented up to 30° from vertical, wherein the term "vertical," as used herein, refers to the z-direction. Stowable seat 100 in a partially deployed position may have a depth $D_2$ of 27.8 inches (70.61 cm).

Figure 3B:
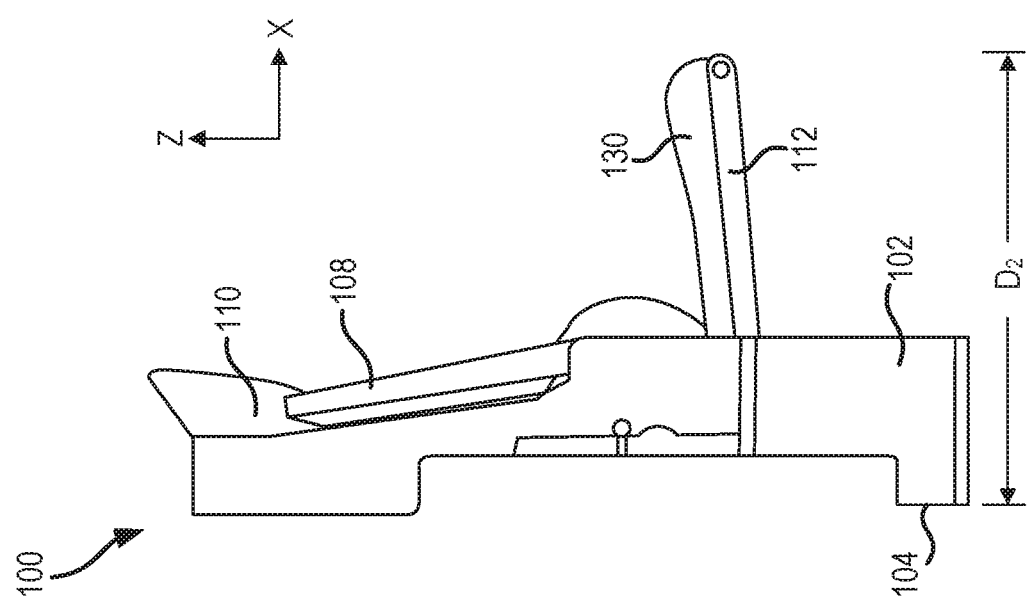
FIG. 3B illustrates a side vide of a stowable seat in a partially deployed position with a legrest attached to the seat bottom, in accordance with various embodiments.

With reference to FIG. 3B, a side view of a stowable seat 100 is shown in a partially deployed position with a legrest 116 coupled to seat bottom 112, in accordance with various embodiments. A cushion 118 may be oriented to face upward (positive z-direction) in the partially deployed position. A footrest 150 may extend from legrest 116.

With reference to FIG. 4A, stowable seat 100 is shown in a deployed position with arm rest 108 deployed, support arm 140 deployed, legrest 116 attached, and footrest 150 fully extended, in accordance with various embodiments. Seat bottom 112 may slide along track 146 when stowable seat 100 is moved to the deployed position. Seat back 110 may be pivotally coupled to seat bottom 112.

In various embodiments, legrest 116 may be deployed by attaching legrest 116 to attachment point 126 of seat bottom 112. Support arm 140 may pivot down (i.e., in the negative z-direction) from legrest 116 to provide load bearing support for legrest 116. Support arm 140 may extend distance $D_4$ from the back of housing 102. An end of footrest 150 may mark the widest point of the envelope of stowable seat 100 in a deployed position at a distance $D_3$ from the back 104 of housing 102.

Seat back 110 may reach an angle greater than 40° from vertical. For example, seat back 110 may be oriented at 45° from vertical in a fully deployed position. Seat bottom 112 may be oriented at an angle from 3° to 15° (e.g., an angle of 5°) above horizontal to retain an occupant on seat bottom 112, wherein the term "horizontal," as used herein, refers to a direction in the xy-plane.

Stowable seat 100 may comprise a suspension recline system 400, comprising a suspension member 410. Suspension recline system 400 is illustrated in a stowed position in FIG. 4A. Suspension member 410 may comprise a first end 412 coupled to seat back 110 of stowable seat 100, and a second end 414 configured to be coupled to legrest 116 for stowable seat 100. Seat back cushion 132 may be coupled to suspension member 410. Seat bottom cushion 130 may be coupled to suspension member 410. Suspension recline system 400 may be moveable between the stowed position and a deployed position.

With reference to FIG. 4B, stowable seat 100 is shown in a fully deployed position with suspension recline system 400 in the deployed position. In the deployed position, second end 414 of suspension member 410 may be coupled to legrest 116, as will be described with further detail below. Seat bottom cushion 130 of seat bottom 112 may move outward, or away from seat back 110 (in the positive x-direction) in response to suspension recline system 400 being deployed. Seat back cushion 132 of seat back 110 may recline in response to suspension recline system 400 being deployed. Stated another way, stowable seat 100 may recline in response to suspension recline system 400 moving to the deployed position. In various embodiments, suspension member 410 may be suspended between seat back 110 and legrest 116 in the deployed position.

Although illustrated as being disposed between seat back cushion 132 and seat back 110, and between seat bottom cushion 130 and seat bottom 112, it is contemplated herein that suspension member may be disposed over seat bottom cushion 130 and over seat back cushion 132.

With reference to FIG. 5A, seat back 110 is illustrated with seat back cushion 132 and suspension recline system 400 removed, in accordance with various embodiments, with momentary reference to FIG. 4B. Seat back 110 may comprise a seat back chassis 510. Seat back chassis 510 may comprise a metal material, a composite material, or may comprise a plastic material, or any other suitable material for providing structural support for a seat back. A first plurality of apertures 501, including aperture 504, and a second plurality of apertures 502, including aperture 506, may be disposed in seat back 110. Plurality of apertures 501, 502 may extend from a front surface 512 to an opposite back surface of seat back chassis 510.

With combined reference to FIG. 5A, FIG. 5B, and FIG. 5C, suspension member 410 may be coupled to seat back chassis 510. Suspension member 410 may comprise a plurality of straps 422 including first strap 424 and second strap 426. Plurality of straps 422 may be spaced along the width $W_2$ of suspension member 410. Suspension member 410 may be installed by inserting the plurality of straps 422 through first plurality of apertures 501 and second plurality of apertures 502. For example, second strap 426 may be inserted through aperture 506, routed along the back side of seat back 110 and inserted through aperture 504 where it may be attached to first strap 424 to couple suspension member 410 to seat back 110. In various embodiments, first strap 424 and second strap 426 may be coupled via a hook and loop attachment. A rigid insert 530 may be coupled to suspension member 410, as will be described in further detail below.

In various embodiments, suspension member 410 may comprise a fabric material. Suspension member 410 may comprise nylon, aramid fibers, and/or cotton. Suspension member 410 may comprise woven, non-woven, and/or knitted fibers. Suspension member 410 may be flame resistant. Suspension member 410 may comprise one or more layers. For example, suspension member 410 may comprise two or more sheets of fabric sewn or glued together. Plurality of straps 422 may comprise a material similar to suspension member 410. In various embodiments, the width $W_2$ of suspension member 410 may be substantially equal to the width of seat back 110. In various embodiments, the width $W_2$ of suspension member 410 may be between 75% and 110% of the width of seat back 110, and in various embodiments, between 75% and 100% of the width of seat back 110, and in various embodiments, between 85% and 100% of the width of seat back 110.

In various embodiments, first plurality of apertures 501 and second plurality of apertures 502 may already exist on typical seat backs 110. In this regard, suspension member 410 may be retrofitted onto a typical seat back.

Figure 6A:
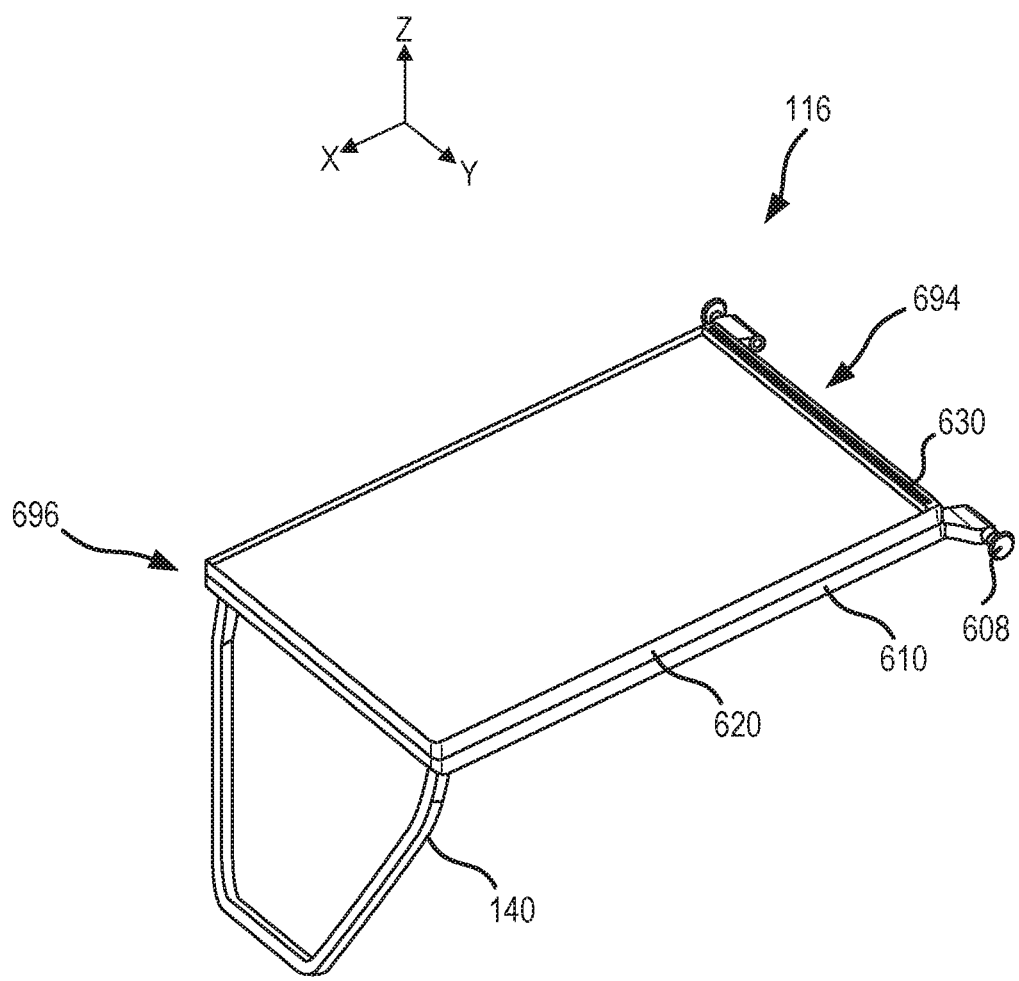
FIG. 6A illustrates a legrest with the cushion removed, a slot being disposed in the footrest, in accordance with various embodiments.

With reference to FIG. 6A, legrest 116 may comprise chassis 610 and top plate 620. In various embodiments, chassis 610 and top plate 620 may comprise two separate pieces of material. However, it is contemplated herein that chassis 610 and top plate 620 may comprise a single unitary member. Legrest 116 may comprise a first side 694 and a second side 696. Legrest 116 may comprise an attachment member 608 at first side 694.

A slot 630 may be disposed in first end 694 of legrest 116. In various embodiments, slot 630 may be disposed in top plate 620.

Figure 6B:
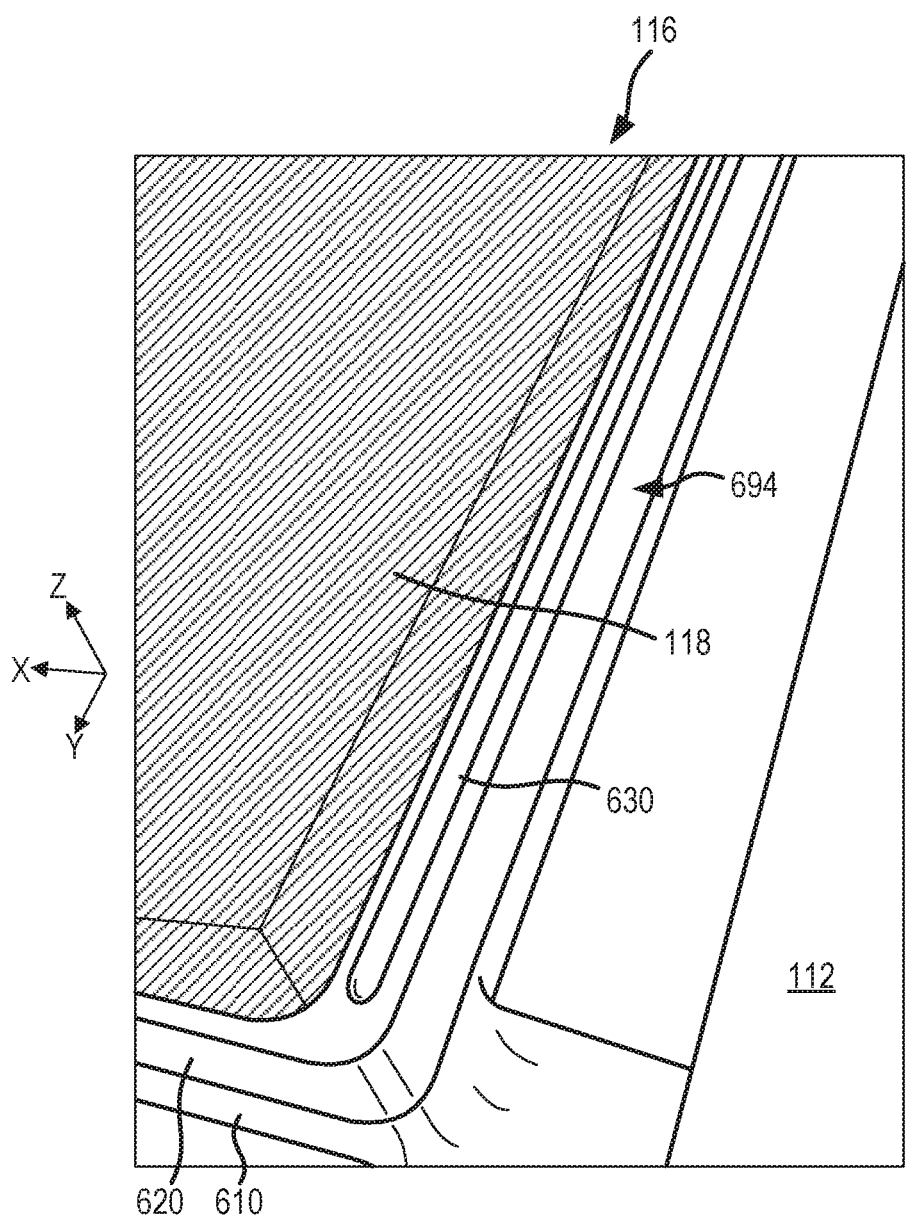
FIG. 6B illustrates the legrest coupled to a seat bottom, in accordance with various embodiments.

With reference to FIG. 6B, slot 630 may comprise a high aspect ratio slot, in accordance with various embodiments. High aspect, in this regard, may refer to a slot having a width (measured in the y-direction) at least two times greater its length (measured in the x-direction), and in various embodiments, having a width at least four times greater than its length, and in various embodiments, having a width at least 10 times greater than its length, and in various embodiments, having a width at least 20 times greater than its length. Slot 630 may be disposed along the width (in the y-direction) of legrest 116. Although illustrated as one continuous slot, it is contemplated herein that slot 630 may be segmented and that rigid insert 530 may be similarly segmented, complementary to slot 630.

Figure 7:
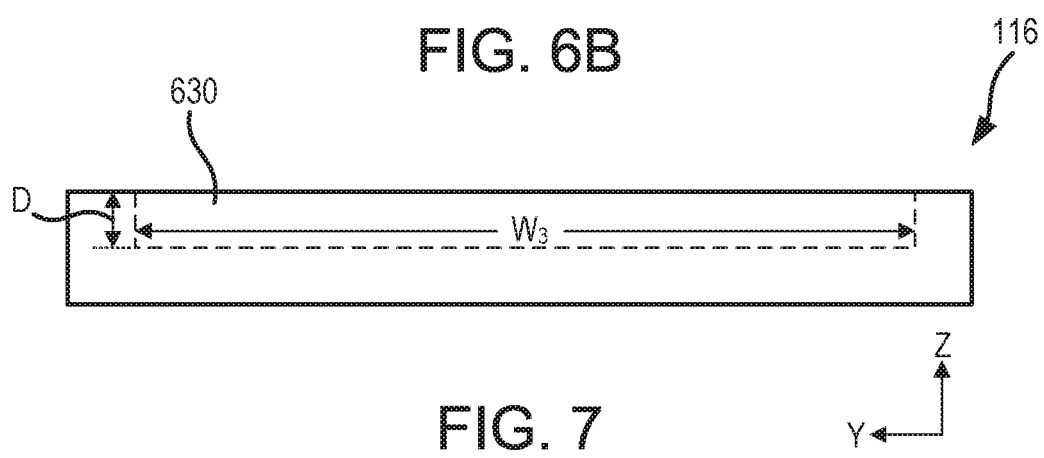
FIG. 7 illustrates a cross-section view of the legrest with the slot, in accordance with various embodiments.

With reference to FIG. 7, a cross-section view of legrest 116 is illustrated, in accordance with various embodiments. Slot 630 may comprise a width $W_3$. In various embodiments, width $W_3$ may be substantially equal to width $W_2$, with momentary reference to FIG. 5C. In various embodiments, slot 630 may comprise a depth D.

Figure 8A:
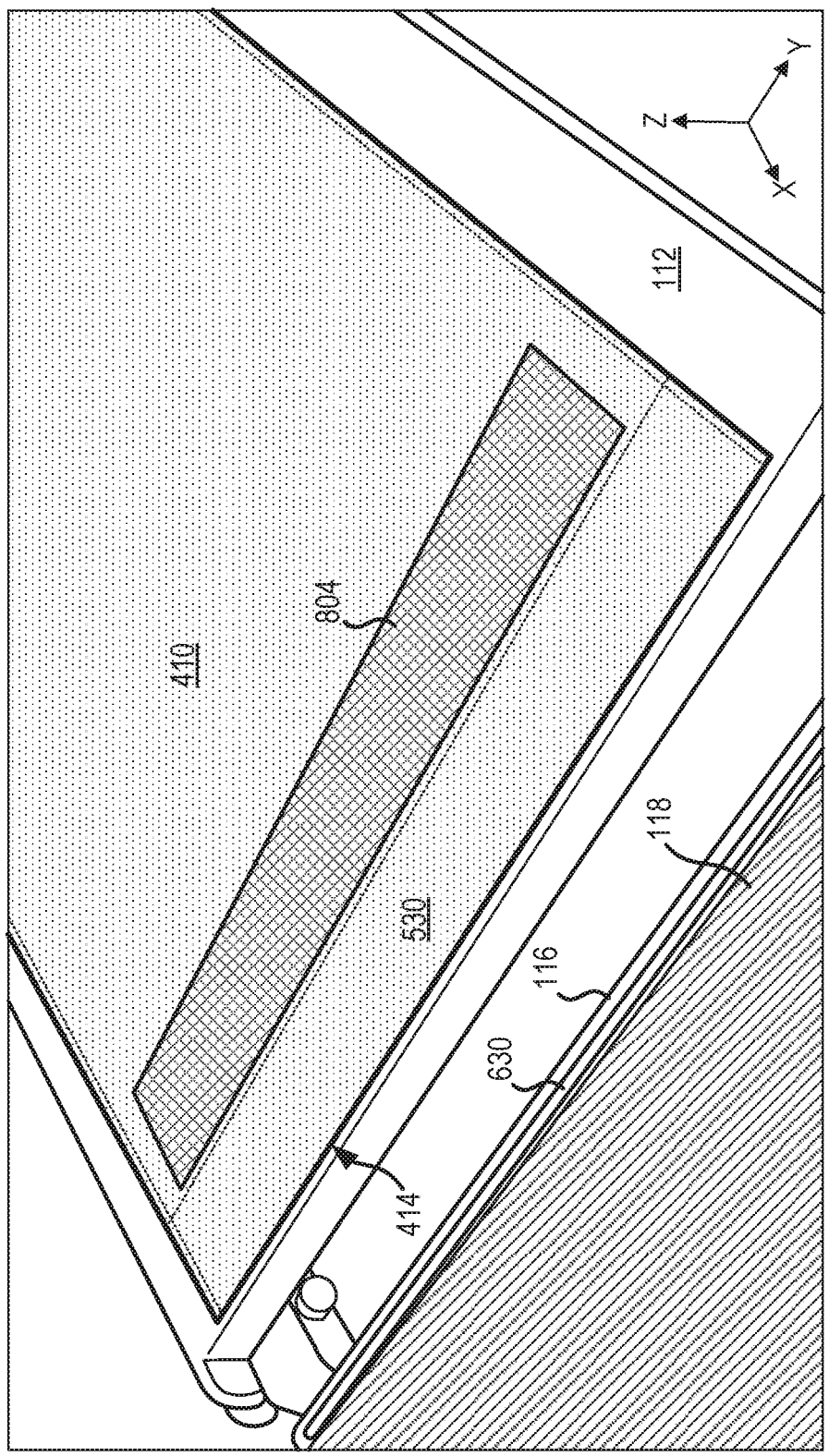
FIG. 8A illustrates a perspective view of the legrest coupled to the seat bottom, the seat bottom with the cushion removed, and the suspension member in a stowed position, in accordance with various embodiments.

With reference to FIG. 8A, suspension member 410 may comprise a rigid insert 530 disposed at second end 414. In various embodiments, rigid insert 530 may comprise a sheet of metal. In various embodiments, the width (in the y-direction) of rigid insert 530 may be substantially equal to width $W_2$, with momentary reference to FIG. 5C. In various embodiments, rigid insert 530 may be disposed between layers of suspension member 410. For example, a rigid insert 530 may be disposed between a first layer and a second layer of suspension member 410. The first layer and the second layer may be sewn, glued, or otherwise coupled together to retain rigid insert 530. An attachment feature 804 may be coupled to suspension member 410. Attachment feature 804 may be for coupling cushion 118, with momentary reference to FIG. 4B, to suspension member 410. Attachment feature 804 may comprise a hook and loop attachment.

Figure 8B:
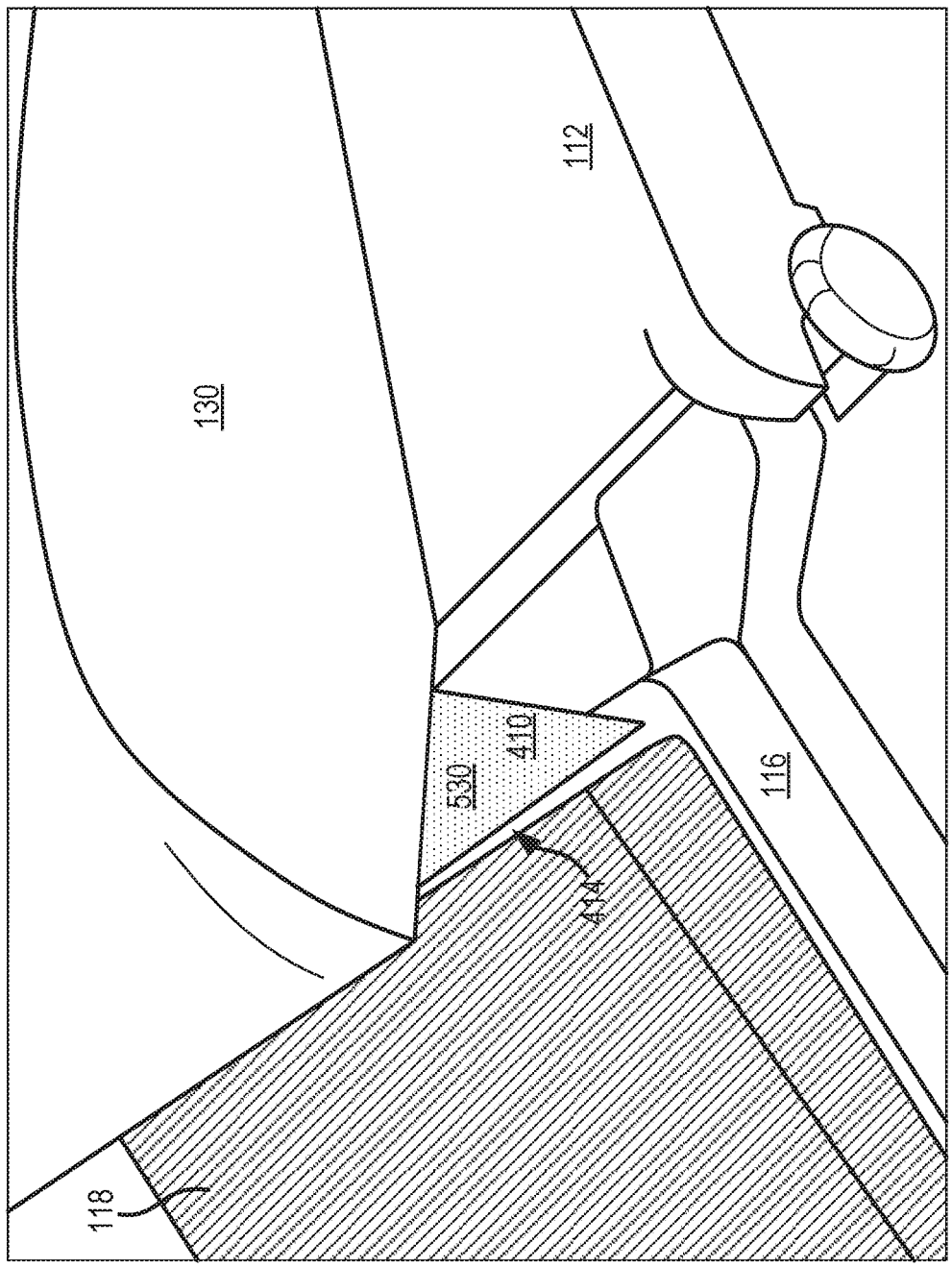
FIG. 8B illustrates a perspective view of the legrest coupled to the seat bottom, the cushion lifted with a rigid insert of the suspension member hanging from the cushion, in accordance with various embodiments.

With reference to FIG. 8B, second end 414 of suspension member 410 may fall away from seat bottom cushion 130 in response to seat bottom cushion 130 being lifted. In this regard, rigid insert 530 may hang down from seat bottom cushion 130. Stated another way, suspension member 410 may bend or fold at rigid insert 530.

Figure 8C:
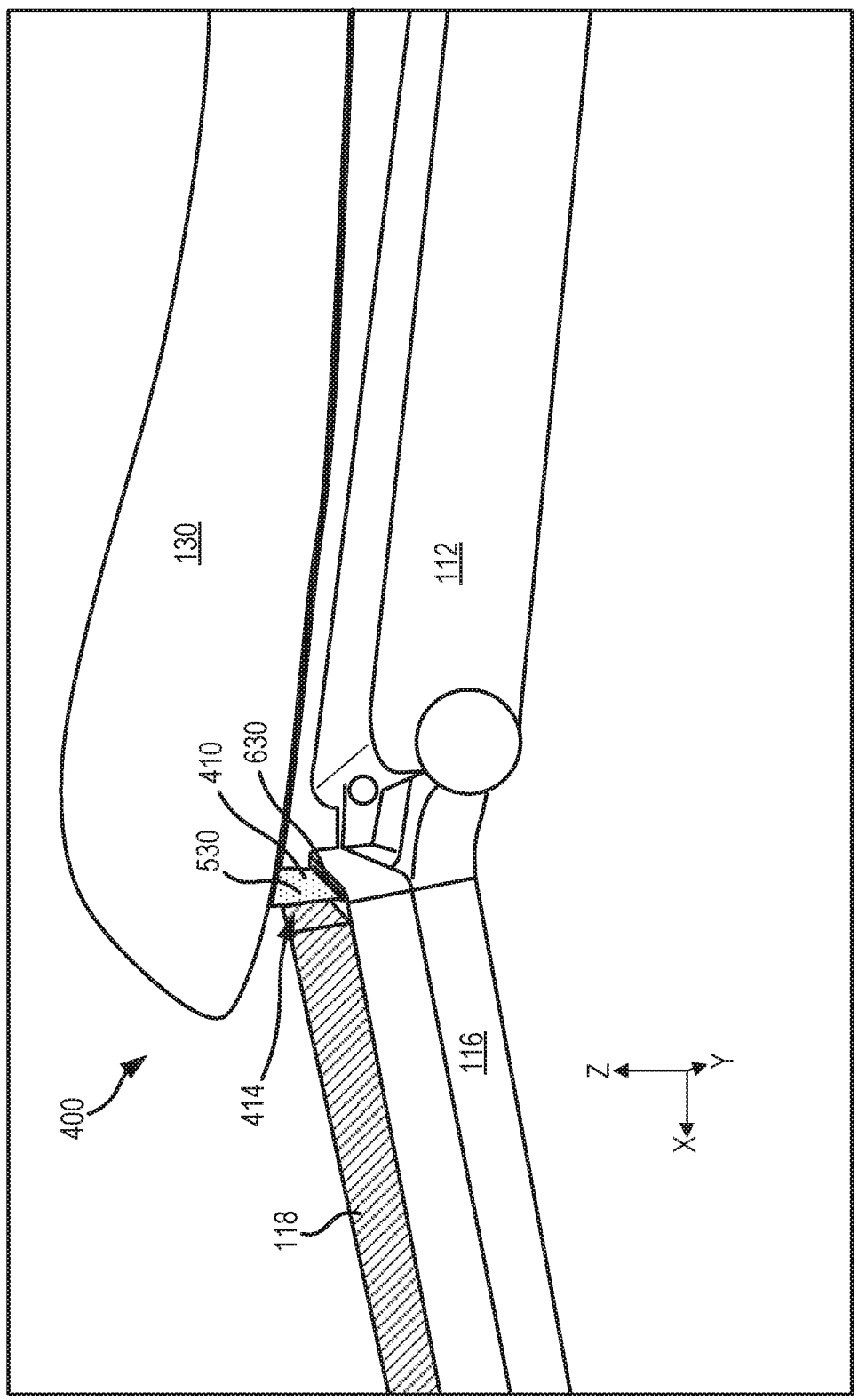
FIG. 8C illustrates a perspective view of the legrest coupled to the seat bottom, the suspension recline system in the deployed position with the rigid insert extending from the slot, in accordance with various embodiments.

With reference to FIG. 8C, second end 414 may be inserted into slot 630. In this regard, rigid insert 530 may extend from slot 630 towards seat bottom cushion 130. Rigid insert 530 may provide support to seat bottom cushion 130. Seat bottom cushion 130 may be tilted (in the clockwise direction in FIG. 8C) in response to suspension recline system 400 being deployed. Stated another way, seat bottom cushion 130 may be tilted (in the clockwise direction in FIG. 8C) in response to rigid insert 530 being inserted into slot 630. Stated another way, rigid insert 530 may extend above (in the positive z-direction) seat bottom 112 and support seat bottom cushion 130 in a tilted position when suspension member 410 is in the deployed position. In this regard, seat bottom cushion 130 may be suspended by suspension member 410.

Figure 9:
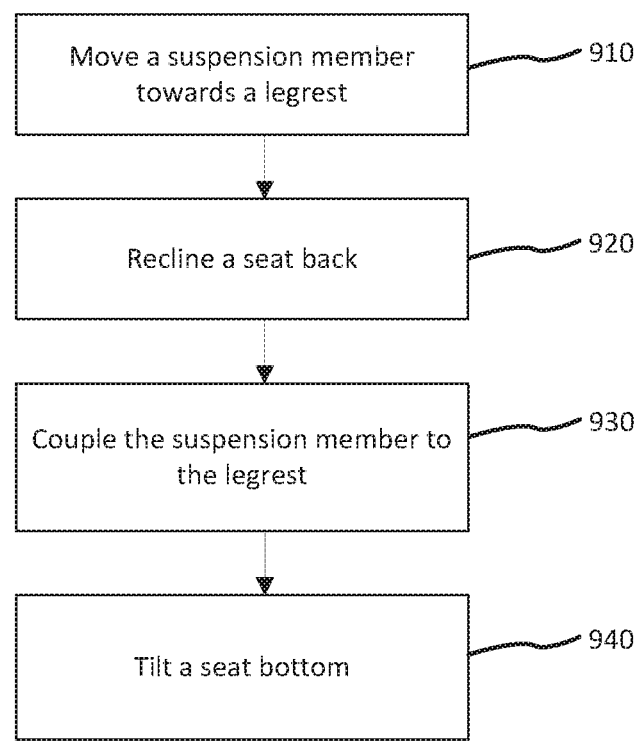
FIG. 9 illustrates a method for reclining a seat, in accordance with various embodiments.

With reference to FIG. 9, a method 900 for reclining a seat is illustrated, in accordance with various embodiments. Method 900 includes moving a suspension member towards a legrest (step 910). Method 900 includes reclining a seat back (step 920). Method 900 includes coupling the suspension member to the legrest (step 930). Method 900 may include tilting a seat bottom (step 940).

With combined reference to FIG. 4A, FIG. 4B, and FIG. 9, step 910 may include moving second end 414 of suspension member 410 towards legrest 116. Step 920 may include reclining seat back cushion 132 of seat back 110 in response to second end 414 being moved towards legrest 116. Step 930 may include coupling at least a portion of the second end 414 to the legrest 116. Step 940 may include tilting seat bottom cushion 130 of seat bottom 112 in response to the coupling.

Figure 10:
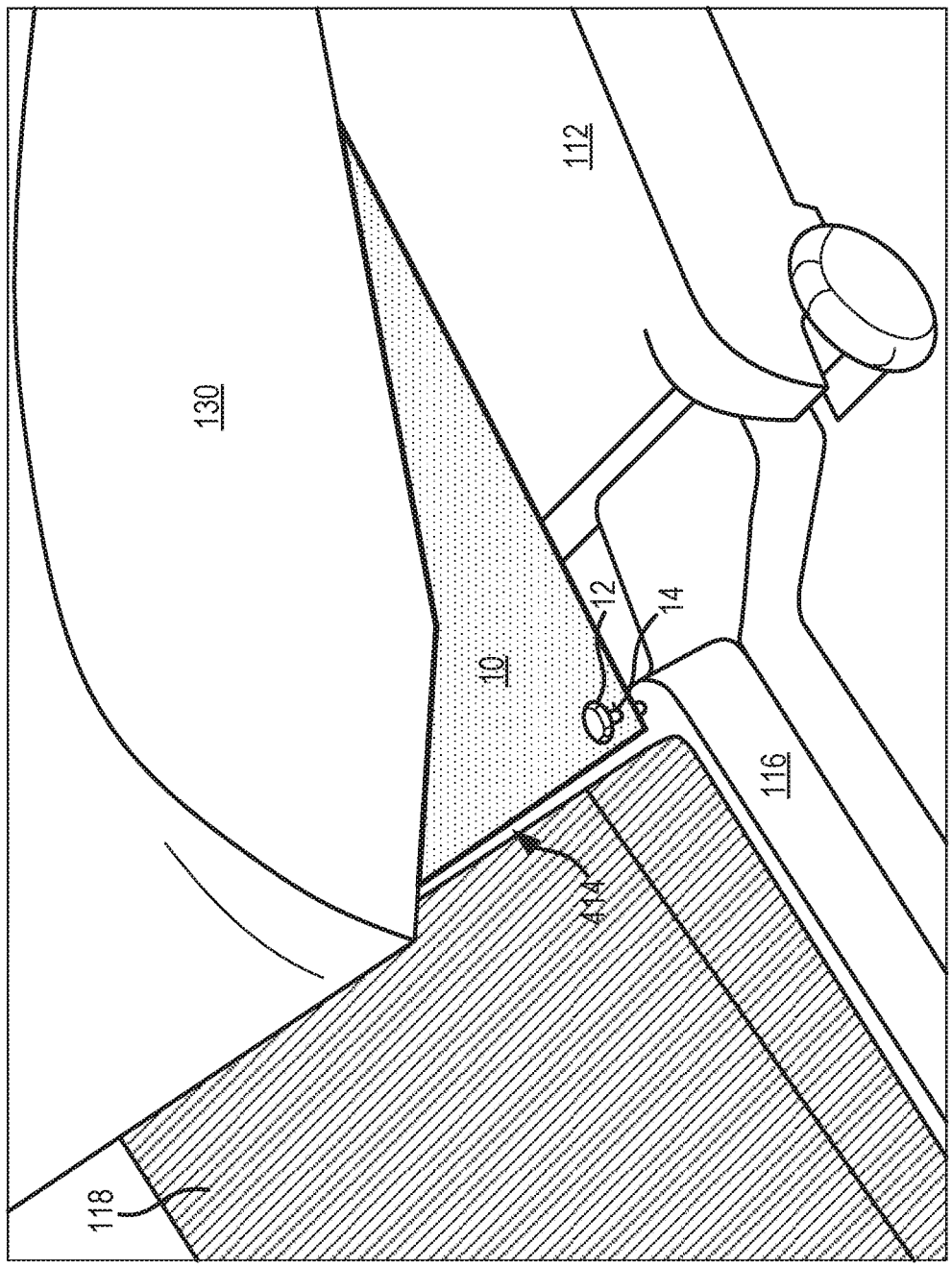
FIG. 10 illustrates a perspective view of the legrest coupled to the seat bottom, the suspension member coupled to an attachment knob extending from the legrest, in accordance with various embodiments.

It is contemplated herein that the suspension member may be coupled to the legrest via any suitable attachment. With reference to FIG. 10, a suspension member 10 is illustrated in the deployed position. Suspension member 10 may be similar to suspension member 410, with momentary reference to FIG. 8B, except that suspension member 10 has an attachment aperture 14 disposed in second end 414 of suspension member 10. An attachment knob 12 may extend from legrest 116. Suspension member 10 may be placed over attachment knob 12, with attachment knob 12 extending through attachment aperture 14 to couple suspension member 10 to legrest 116.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A suspension recline system for a stowable seat, comprising:
  a suspension member comprising:
    a first end configured to be coupled to a seat back of the stowable seat;
    a second end configured to be coupled to a legrest for the stowable seat; and
    a rigid insert coupled to the second end, wherein, in the deployed position, the rigid insert is configured to be inserted into a slot disposed in the legrest,
    wherein the suspension recline system is moveable between a stowed position and a deployed position, and
    the suspension member is configured to recline in response to the second end of the suspension member moving towards the legrest.

2. The suspension recline system of claim 1, wherein the suspension member comprises a fabric.

3. The suspension recline system of claim 2, wherein the suspension member is configured to be coupled to a seat back cushion and a seat bottom cushion, the seat bottom cushion configured to move away from the seat back in response to the suspension recline system moving to the deployed position, and the seat back cushion configured to recline in response to the suspension recline system moving to the deployed position.

4. The suspension recline system of claim 1, wherein the rigid insert comprises a sheet of metal.

5. The suspension recline system of claim 4, wherein the suspension member is configured to bend at the rigid insert.

6. The suspension recline system of claim 5, wherein the rigid insert is configured to support the seat bottom cushion in a tilted position, in the deployed position.

7. The suspension recline system of claim 6, wherein the suspension member is configured to be suspended between the seat back and the legrest, in the deployed position.

* * * * *